Figures 1, 2:
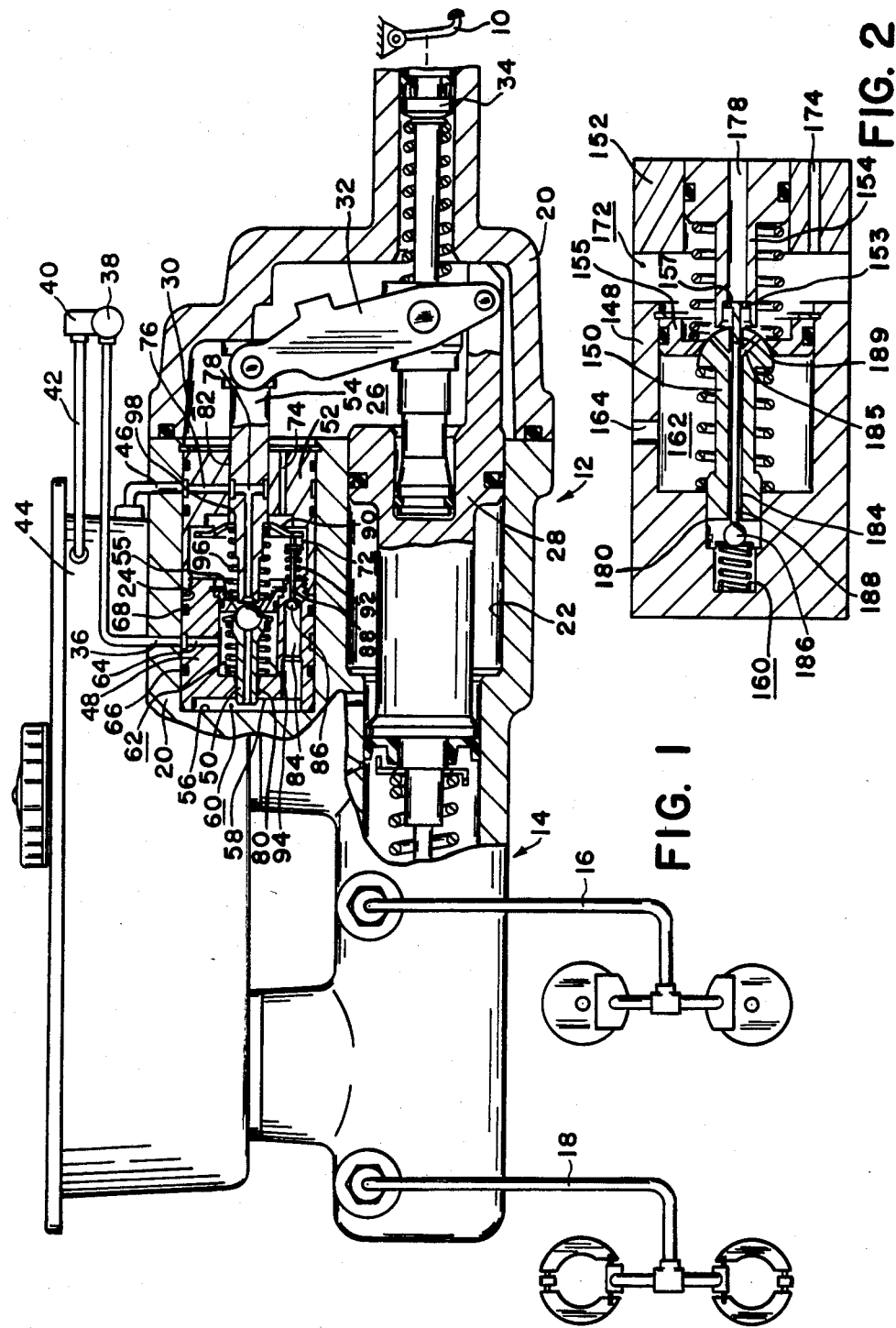

United States Patent [19]

Myers et al.

[11] Patent Number: 4,625,515

[45] Date of Patent: Dec. 2, 1986

[54] BRAKE BOOSTER

[75] Inventors: Lawrence R. Myers; Lloyd G. Bach, both of South Bend, Ind.

[73] Assignee: Allied Corporation, Morristown, N.J.

[21] Appl. No.: 652,384

[22] Filed: Sep. 20, 1984

[51] Int. Cl.[4] .......................................... B60T 13/20
[52] U.S. Cl. .......................................... 60/551; 92/86
[58] Field of Search ............... 60/547.1, 551, 548, 60/582; 92/82, 86

[56] References Cited

U.S. PATENT DOCUMENTS

| 3,869,963 | 3/1975 | Schindel | 92/86 |
| 3,995,529 | 12/1976 | Bach | 60/547.1 |
| 4,052,851 | 10/1977 | Brown | 60/404 |
| 4,341,076 | 7/1982 | Steffes | 60/547.1 |
| 4,422,293 | 12/1983 | Ewald | 60/547.1 |
| 4,441,319 | 4/1984 | Brown | 60/548 |
| 4,539,892 | 9/1985 | Mackiewicz | 60/547.3 |

FOREIGN PATENT DOCUMENTS 2077375 4/1981 United Kingdom .

Primary Examiner—Abraham Hershkovitz
Attorney, Agent, or Firm—Ken C. Decker

[57] ABSTRACT

A brake booster includes a valve member which is operable to communicate fluid pressure to a pressure chamber for generating a power assist during braking. The brake booster provides an auxiliary chamber to trap fluid pressure leakage past the valve member. An input member is operable during braking to initially vent the auxiliary chamber and thereafter to control operation of the valve member.

13 Claims, 2 Drawing Figures

BRAKE BOOSTER

The present invention covers a brake booster wherein fluid pressure is selectively communicated to a pressure chamber to provide a power assist during braking.

A brake booster is illustrated in U.S. Pat. No. 4,441,319 (Arthur K. Brown). A valve member cooperates with an input member during braking to communicate fluid pressure from a pressure source to a pressure chamber to bias a piston to move during braking. In order to move the valve member, the force applied by the input member must overcome the resistance of a spring biasing the valve member against a seat and the resistance of a seal engaging the valve member to prevent leakage past the valve member. With substantial fluid pressure exposed to the seal, the friction force of the seal opposing movement of the valve member requires more effort than desired during braking to initiate the power assist. Consequently, it is desired to reduce the friction force of the seal engaging the valve member in a brake booster as described in the aforementioned patent, so that the valve member will operate in a substantially "frictionless" manner.

The present invention covers a brake booster comprising a housing substantially defining a pressure chamber, an output piston exposed to the pressure chamber so that fluid pressure communicated to the pressure chamber acts against the output piston to move the latter to a brake applied position during braking, and a valve assembly operable during the brake application to communicate the fluid pressure to the pressure chamber, the valve assembly including an input member cooperating with a valve member to open communication between a pressure source and the pressure chamber during braking, the housing defining an intermediate chamber communicating with the pressure chamber and movably receiving the input member, a pressure cavity communicating with the pressure source and movably receiving the valve member and an auxiliary chamber normally isolated from the intermediate chamber upon termination of braking, characterized in that said input member cooperates with means for opening communication between said auxiliary chamber and said intermediate chamber before said input member opens communication between said pressure cavity and said intermediate chamber so that any fluid pressure leakage from said pressure cavity via said valve member to said auxiliary chamber will be initially communicated during braking to said pressure chamber via said intermediate chamber and said fluid pressure leakage is trapped upon termination of braking in said auxiliary chamber.

It is an advantage of the present invention that the valve member is operable in the absence of a seal cooperating therewith.

In the drawings, FIG. 1 illustrates a brake system with a brake booster constructed in accordance with the present invention shown in cross section. FIG. 2 is a partial cross sectional view of an alternative valve assembly for the brake booster of FIG. 1.

The brake system includes a brake pedal 10 coupled to a brake booster 12 which is operable during braking to provide a power assist for a master cylinder 14 so that fluid pressure will communicate with brake circuits 16 and 18. The brake booster 12 defines a housing 20 with a pair of bores 22 and 24 leading to a pressure chamber 26. An output piston 28 is movably disposed in the bore 22 and a valve assembly 30 is disposed in the bore 24. An input arm 32 is pivotally connected with the output piston 28 and the valve assembly 30 so that an input rod 34 connected to the brake pedal 10 and the input arm 32 will initiate actuation of the valve assembly 30 during braking. The housing 20 forms an inlet 36 communicating with an accumulator 38 which stores fluid pressure. A pump 40 is coupled to the accumulator 38 to maintain a predetermined fluid pressure level in the accumulator. A conduit 42 extends from the pump 40 to a reservoir 44 to supply fluid for the pump and the accumulator and an outlet 46 on the housing 20 communicates with the reservoir 44.

In accordance with the invention the valve assembly 30 comprises a first part 48 carrying a valve member 50 and a second part 52 carrying an input member 54. The input member 54 is coupled to the input arm 32 and normally spaced from the valve member 50 in a rest position. The first part 48 carries a valve seat 55 engaged with the valve member 50 in the rest position. The first part 48 is engageable with an end wall 56 of bore 24, and a pocket 58 defined by the first part adjacent the end wall 56 cooperates with the latter to form an auxiliary chamber 60. The first part 48 defines a pressure cavity 62 receiving the valve member 50 and communicating with the accumulator 38 via at least one radial passage 64 and the inlet 36. A pair of seals 66 and 68 cooperate with the wall of bore 24 and the first part 48 to isolate fluid communication between the inlet 36 and the radial passage 64. The second part 52 is coupled to the first part by suitable means, such as threads 70, to form an intermediate chamber 72 communicating directly with the pressure chamber 26 at all times via a passage 74 in the second part 52. A radial passage 76 on the second part 52 communicates the outlet 46 with a passage 78 on the input member so that when the input member is spaced from the valve member in the rest position, the intermediate chamber 72 and the pressure chamber 26 are in communication with the reservoir 44 via passages 76 and 78 and outlet 46.

In order to movably support the valve member 50, the first part forms a bore 80 movably receiving the valve member with a close sliding fit therebetween. Similarly, the second part 52 forms a bore 82 movably receiving the input member 54 with a close sliding fit therebetween. The passage 76 intersects the bore 82. As shown, the valve member 50 and the input member 54 are carried by the first and second parts in the absence of any seals.

The auxiliary chamber 60 leads to a passage 84 extending to the intermediate chamber 72. A check valve 86 is disposed in the passage 84 to normally close communication through the passage 84. A stem 88 connected to the check valve 86 extends into the intermediate chamber 72. The input member 54 carries a lever 90 engageable with the stem 88 to control the operation of the check valve 86. A first spring 92 biases the check valve 86 to a closed position. A second spring 94 biases the valve member 50 to a closed position in engagement with the seat 56. A third spring 96 biases the input member 54 to a rest position spaced from the valve member 50. The input member is provided with a shoulder 98 and the third spring 96 engages the lever 90 to resiliently retain the latter in engagement with the shoulder 98.

In the rest position illustrated, the intermediate chamber 72 and the pressure chamber 26 are in communication with the reservoir 44 via outlet 46, and passages 76 and 78. Fluid pressure is stored in pressure cavity 62 via passage 64 and inlet 36. The valve member sealingly engages the seat 55 to prevent fluid pressure leakage into intermediate chamber 72. With the close sliding fit at the bore 80 there is minor leakage of fluid pressure from the pressure cavity 62 to the auxiliary chamber 60. However, fluid pressure leaked to the auxiliary chamber 60 is trapped therein as the check valve 86 closes the passage 84 and the auxiliary chamber 60 from the intermediate chamber 72. Consequently, the brake booster 12 will retain fluid pressure in the pressure cavity 62 and the auxiliary chamber 60 over long periods of time as the leakage from the pressure cavity 62 is controlled.

During braking the pedal 10 is pivoted to move rod 34 and pivot arm 32. The input member 54 is moved toward the end wall 56 and the lever 90 opens the check valve 86 before the input member fully engages the valve member 50, so that the fluid pressure level in the auxiliary chamber is equal to the fluid pressure level in the intermediate chamber 72, the pressure chamber 26 and the reservoir 44. Thereafter, the input member 54 fully engages the valve member 50 to close passage 78 and open pressure cavity 62 to the pressure chamber 26 via the intermediate chamber 72 and the second part passage 74. Fluid pressure communicates with the pressure chamber to bias the output piston 28 to move toward the master cylinder 14. Fluid pressure also communicates with the auxiliary chamber 60 to pressure balance the valve member 50. Upon termination of braking, the input member initially returns the valve member 50 to a sealing engagement with seat 55 to isolate the pressure cavity from the intermediate chamber 72. Thereafter, the input member vents the pressure chamber 26, the intermediate chamber 72 and the auxiliary chamber 60 to the reservoir 44. Finally, the input member 54 closes the passage 84 via check valve 86 and lever 90 to isolate the auxiliary chamber 60 as illustrated in the drawing.

In order to reduce the effort required to move the input member 54 as the lever 90 opens the check valve 86, the dimension of the passage 84 at the check valve 86 is substantially smaller than the dimension of the valve member 50 sealingly engaging the valve seat. Consequently, the area of the check valve 86 exposed to the fluid pressure in the auxiliary chamber is very small to readily permit movement of the check valve during braking.

Turning to FIG. 2, the alternative embodiment forms a passage 184 extending through the valve member 150 and a stem 188 extends from a check valve 186, engageable with the valve member 150, to the input member 154. The stem 188 connects with the input member 154 via a plate 153 which is apertured at 157 to open the passage 178 to the intermediate chamber 172. The valve member passage 184 also includes branches 185 extending outside the diameter of the input member 154 at the valve member. These branches communicate the auxiliary chamber 160 with the intermediate chamber 172 and the reservoir not shown in FIG. 2) via passage 178. The input member 154 is shown in an applied position with the check valve 186 opened before the input member 154 sealingly engages the valve member 150 to open pressure cavity 162 to intermediate chamber 172. The forward portion 189 of passage 184 forms a sliding fit with the stem 188 so that fluid pressure will not readily communicate with passage 178 via branches 185 when the input member is sealingly engaged with the valve member to separate the latter from seat 155.

We claim:

1. A brake booster comprising a housing substantially defining a pressure chamber, an output piston exposed to the pressure chamber so that fluid pressure communicated to the pressure chamber acts against the output piston to move the latter to a brake applied position during braking, and a valve assembly operable during the brake application to communicate the fluid pressure to the pressure chamber, the valve assembly including an input member cooperating with a valve member to open communication between a pressure source and the pressure chamber during braking, the housing defining an intermediate chamber communicating with the pressure chamber and movably receiving the input member, a pressure cavity communicating with the pressure source and movably receiving the valve member and an auxiliary chamber normally isolated from the intermediate chamber upon termination of braking, and valve means controlling communication between said auxiliary chamber and said intermediate chamber, said input member operating said valve means for opening communication between said auxiliary chamber and said intermediate chamber before said input member opens communication between said pressure cavity and said intermediate chamber upon actuation of the valve assembly so that any fluid pressure leakage from said pressure cavity prior to actuation of the valve assembly to said auxiliary chamber will be initially communicated during actuation of the valve assembly to said pressure chamber via said intermediate chamber by said valve means and said fluid pressure leakage is trapped upon termination of braking in said auxiliary chamber.

2. The brake booster of claim 1 in which said housing defines a bore leading to the pressure chamber, a first part disposed in the bore carries said valve member and a second part disposed in the bore carries said input member, said first part defining a first passage communicating said auxiliary chamber with said intermediate chamber, said valve means including a check valve disposed in said first passage to normally close communication through said first passage.

3. The brake booster of claim 2 in which said input member carries a lever within said intermediate chamber and said check valve includes a stem extending into said intermediate chamber to cooperate with said lever.

4. The brake booster of claim 2 in which said input member and said valve member are slidably supported by said second and first parts, respectively, in the absence of any seals.

5. The brake booster of claim 2 in which said input member defines a shoulder within said intermediate chamber and a resilient member extends from said first part to said means to bias the latter into engagement with said shoulder.

6. The brake booster of claim 2 in which said second part defines a second passage communicating with a third passage defined by said input member upon termination of braking, and said second part defines a fourth passage communicating said intermediate chamber with said pressure chamber.

7. The brake booster of claim 2 in which said bore terminates at an end wall, said first part engaging to substantially define said auxiliary chamber.

8. The brake booster of claim 1 in which said valve member defines an area exposed to the fluid pressure within said pressure cavity and said valve means defines an area exposed to the auxiliary chamber, and the area of said valve means area is smaller than said valve member area.

9. The brake booster of claim 1 in which said valve means comprises a check valve engageable with said valve member.

10. The brake booster of claim 1 in which said valve member defines a passage extending from said auxiliary chamber to said intermediate chamber, said valve means including a check valve operable to normally close said valve member passage.

11. The brake booster of claim 10 in which said check valve includes a stem extending outwardly from said valve member to cooperate with said input member.

12. The brake booster of claim 11 in which said stem defines a sliding fit with a forward end of said valve member in said passage and a clearance with the remaining portion of said valve member in said passage.

13. The brake booster of claim 1 in which said valve member is slidably supported by said first part in the absence of any seals to form a substantially frictionless interface therewith.

* * * * *